(12) United States Patent
Ouyang et al.

(10) Patent No.: US 10,539,742 B2
(45) Date of Patent: Jan. 21, 2020

(54) PHOTONIC CRYSTAL ALL-OPTICAL MULTISTEP-DELAY SELF-OR-TRANSFORMATION LOGIC GATE

(71) Applicant: Zhengbiao Ouyang, Shenzhen, Guangdong (CN)

(72) Inventors: Zhengbiao Ouyang, Guangdong (CN); Quanqiang Yu, Guangdong (CN)

(73) Assignee: SHENZHEN UNIVERSITY, Shenzhen (CN)

( * ) Notice: Subject to any disclaimer, the term of this patent is extended or adjusted under 35 U.S.C. 154(b) by 246 days.

(21) Appl. No.: 15/626,226

(22) Filed: Jun. 19, 2017

(65) Prior Publication Data

US 2017/0307821 A1    Oct. 26, 2017

Related U.S. Application Data

(63) Continuation of application No. PCT/CN2015/097839, filed on Dec. 18, 2015.

(30) Foreign Application Priority Data

Dec. 19, 2014 (CN) .......................... 2014 1 0804438

(51) Int. Cl.
  *G02B 6/12* (2006.01)
  *G02B 6/122* (2006.01)
  (Continued)

(52) U.S. Cl.
  CPC .......... *G02B 6/1225* (2013.01); *G02F 1/365* (2013.01); *G02F 3/00* (2013.01); *G02B 6/125* (2013.01); *G02B 2006/1213* (2013.01)

(58) Field of Classification Search
  CPC .................. G02B 6/1225; G02B 6/125; G02B 2006/1213; G02F 1/365; G02F 3/00
  (Continued)

(56) References Cited

U.S. PATENT DOCUMENTS

2006/0062507 A1 * 3/2006 Yanik .................... B82Y 20/00
                                                     385/5

FOREIGN PATENT DOCUMENTS

CN          101416107 A       4/2009

OTHER PUBLICATIONS

1st Office Action of counterpart Chinese Patent Application No. 201410804438.5 dated Jan. 25, 2017.

* cited by examiner

*Primary Examiner* — Jerry M Blevins
(74) *Attorney, Agent, or Firm* — Zhihua Han; Wen IP LLC

(57) ABSTRACT

A PhC all-optical multistep-delay self-OR-transformation logic gate including an optical switch unit, a PhC structure unit, a reference-light, a memory or delayer, a D-type flip-flop unit and a wave absorbing load; a logic signal X is connected to the input port of a two-branch waveguide whose two output ports are respectively connected with the input port of the memory and the logic-signal input port of the optical switch unit; the output port of the memory is connected with the delay-signal input port of the optical switch unit; the reference-light source is connected with the reference-light input port of the optical switch unit whose three intermediate-signal output ports are respectively connected with the first and second intermediate-signal input ports of the PhC structure unit and the wave absorbing load; and the output port of the PhC structure unit is connected with the D-signal input port of the D-type flip-flop unit.

13 Claims, 4 Drawing Sheets

(51) Int. Cl.
*G02F 3/00* (2006.01)
*G02F 1/365* (2006.01)
*G02B 6/125* (2006.01)

(58) Field of Classification Search
USPC .......................................................... 385/24
See application file for complete search history.

| A | B | C | Y |
|---|---|---|---|
| 0 | 0 | 0 | 0 |
| 0 | 0 | 1 | 0 |
| 0 | 1 | 0 | 0 |
| 0 | 1 | 1 | 1 |
| 1 | 0 | 0 | 0 |
| 1 | 0 | 1 | 0 |

FIG. 4

PHOTONIC CRYSTAL ALL-OPTICAL MULTISTEP-DELAY SELF-OR-TRANSFORMATION LOGIC GATE

CROSS-REFERENCE TO RELATED APPLICATION

This application is a continuation application of PCT Application No. PCT/CN2015/097839 filed on Dec. 18, 2015, which claims priority to Chinese Patent Application No. 201410804438.5 filed on Dec. 19, 2014, the entire contents of which are hereby incorporated by reference.

FIELD OF THE INVENTION

The present invention relates generally to two-dimensional (2D) photonic crystal (PhC) optical multistep-delay self-OR-transformation logic gates.

BACKGROUND OF THE INVENTION

In 1987, the concept of PhC was proposed separately by E. Yablonovitch from the United States Bell Labs who discussed how to suppress spontaneous radiation and by S. John from Princeton University who made discussions about photonic localization. A PhC is a material structure in which dielectric materials are arranged periodically in space, and is usually an artificial crystal composing f two or more materials having different dielectric constants.

With the emergence of and in-depth research on PhCs, people can control the motion of photons in a PhC material more flexibly and effectively. In combination with traditional semiconductor processes and integrated circuit technologies, design and manufacture of PhCs and devices thereof have continually and rapidly marched towards all-optical processing, and the PhC has become a breakthrough for photonic integration. In December 1999, the PhC was recognized by the American influential magazine *Science* as one of the top-ten scientific advances in 1999, and therefore has become a hot topic in today's scientific research field.

An all-optical logic device mainly includes an optical amplifier-based logic device, a non-linear loop mirror logic device, a Sagnac interference type logic device, a ring cavity logic device, a multi-mode interference logic device, an optical waveguide coupled logic device, a photoisomerized logic device, a polarization switch optical logic device, a transmission-selector optical logic device, etc. These optical logic devices have the common shortcoming of large size in developing large-scale integrated optical circuits. With the improvement of science and technology in recent years, people have also done research and developed quantum optical logic devices, nano material optical logic devices and PhC optical logic devices, which all conform to the dimensional requirement of large-scale photonic integrated optical circuits. For modern manufacturing processes, however, the quantum optical logic devices and the nanomaterial optical logic devices are very difficult to be manufactured, whereas the PhC optical logic devices have competitive advantages in terms of manufacturing process.

In recent years, PhC logic devices have become a hot area of research drawing widespread attentions, and it is highly likely for them to replace the current widely-applied electronic logic devices in the near future. The PhC logic device can directly realize all-optical logical functions, such as "AND", "OR", "NOT" and the like, and is a core device for realizing all-optical computing. In the process of realizing all-optical computing, PhC logical function devices based on "AND", "OR", "NOT", "XOR" and the like have been successfully designed and studied, and various complex logic components are still needed for achieving the goal of all-optical computing.

SUMMARY OF THE INVENTION

The present invention is aimed at overcoming the defects of the prior art and providing a PhC all-optical multistep delay self-OR-transformation logic gate which is compact in structure, strong in anti-interference capability and easy to integrate with other optical logic elements.

The aim of the present invention is fulfilled through the following technical solution.

The PhC all-optical multi-step delay self-OR-transformation logic gate of the present invention includes an optical switch unit, a PhC structure unit, a reference-light source, a memory or delayer, a D-type flip-flop unit and a wave absorbing load; a logic-signal X is connected to the input port of a two-branch waveguide, and the two output ports of the two-branch waveguide are respectively connected with the input port of the memory and the logic-signal input port of the optical switch unit; the output port of the memory is connected with the delay-signal input port of the optical switch unit; the reference-light is connected with the reference-light input port of the optical switch unit; three intermediate-signal output ports of the optical switch unit are respectively connected with the first and second intermediate-signal input ports of the PhC structure unit and the wave absorbing load; a clock-signal CP is connected with the first clock-signal input port of the optical switch unit and the second clock-signal input port of the D-type flip-flop unit respectively through the input port of another two-branch waveguide; and the output port of the PhC structure unit is connected with the D-signal input port of the D-type flip-flop unit.

The optical switch unit is a 3×3 optical selector switch, and includes a clock-signal input port, a delay-signal input port, a logic-signal input port, a reference-light input port and three intermediate-signal output ports; the three intermediate-signal output ports are respectively a first intermediate-signal output port, a second intermediate-signal output port and a third intermediate-signal output port.

The PhC structure unit is a 2D-PhCcross-waveguide nonlinear cavity and is a 2D-PhCcross-waveguide four-port network formed by high-refractive-index dielectric pillars, and the left port, the lower port, the upper port and the right port of the four-port network are respectively a first intermediate-signal input port, a second intermediate-signal input port, a signal-output port and an idle port; two mutually-orthogonal quasi-1D PhC structures are placed in two waveguide directions crossed at a center of across waveguide; a dielectric pillar is arranged in the middle of the cross waveguide, the dielectric pillar is made of a nonlinear material, and the cross section of the dielectric pillar is square, circular, oval, triangular or polygonal; the dielectric constant of a rectangular linear pillar clinging to a central nonlinear pillar and close to the signal-output port is equal to that of the central nonlinear pillar under low-light-power conditions; the quasi-1D PhC structures and the dielectric pillar constitute a waveguide defect cavity.

The memory or delayer includes an input port and an output port; the output signal of the memory is an input signal input to the memory before k steps.

The memory or delayer is the one of k-step delay.

The D-type flip-flop unit includes a clock-signal input port, a D-signal input port and a system-output port; and the input signal of the D-signal input port is equal to the output signal of the output port of the PhC structure unit.

The 2D PhC is of a (2k+1)×(2k+1) structure, where k is an integer more than equal to 3.

The cross section of the high-refractive-index dielectric pillar of the 2D PhC is circular, oval, triangular or polygonal.

The background filling material for the 2D PhC is air or a different low-refractive-index medium with a refractive index less than 1.4.

The refractive index of the dielectric pillar in the quasi-1D PhC of the cross-waveguide is 3.4 or a different value more than 2, and the cross section of the dielectric pillar in the quasi-1D PhC is rectangular, polygonal, circular or oval.

Compared with the prior art, the present invention has the following advantages:

1. Compact in structure and ease of manufacture;
2. Strong anti-interference capability, and ease of integration with other optical logic elements; and
3. High contrast of high and low logic outputs, and fast operation.

These and other objects and advantages of the present invention will become readily apparent to those skilled in the art upon reading the following detailed description and claims and by referring to the accompanying drawings.

BRIEF DESCRIPTION OF THE DRAWINGS

In FIG. 1, the indications are as follows: optical switch unit 01, delay-signal input port 11, logic-signal input port 12, reference-light input port 13, first intermediate-signal output port 14, second intermediate-signal output port 15, third intermediate-signal output port 16, first clock-signal input port, PhC structure unit 02, first intermediate-signal input port 21, second intermediate-signal input port 22, idle port 23, signal output port 24, circular high-refractive-index linear-dielectric pillar 25, first rectangular high-refractive-index linear-dielectric pillar 26, second rectangular high-refractive-index linear-dielectric pillar 27, central nonlinear-dielectric pillar 28, reference-light 03, reference-light E, memory 04, clock-signal CP, D-type flip-flop unit 05, second clock-signal input port 51, D-signal input port 52, system output port 53, wave absorbing load 06.

FIG. 4 is a truth table of the logic functions of a 2D-PhC cross-waveguide nonlinear cavity shown in FIG. 1.

Figure 1:
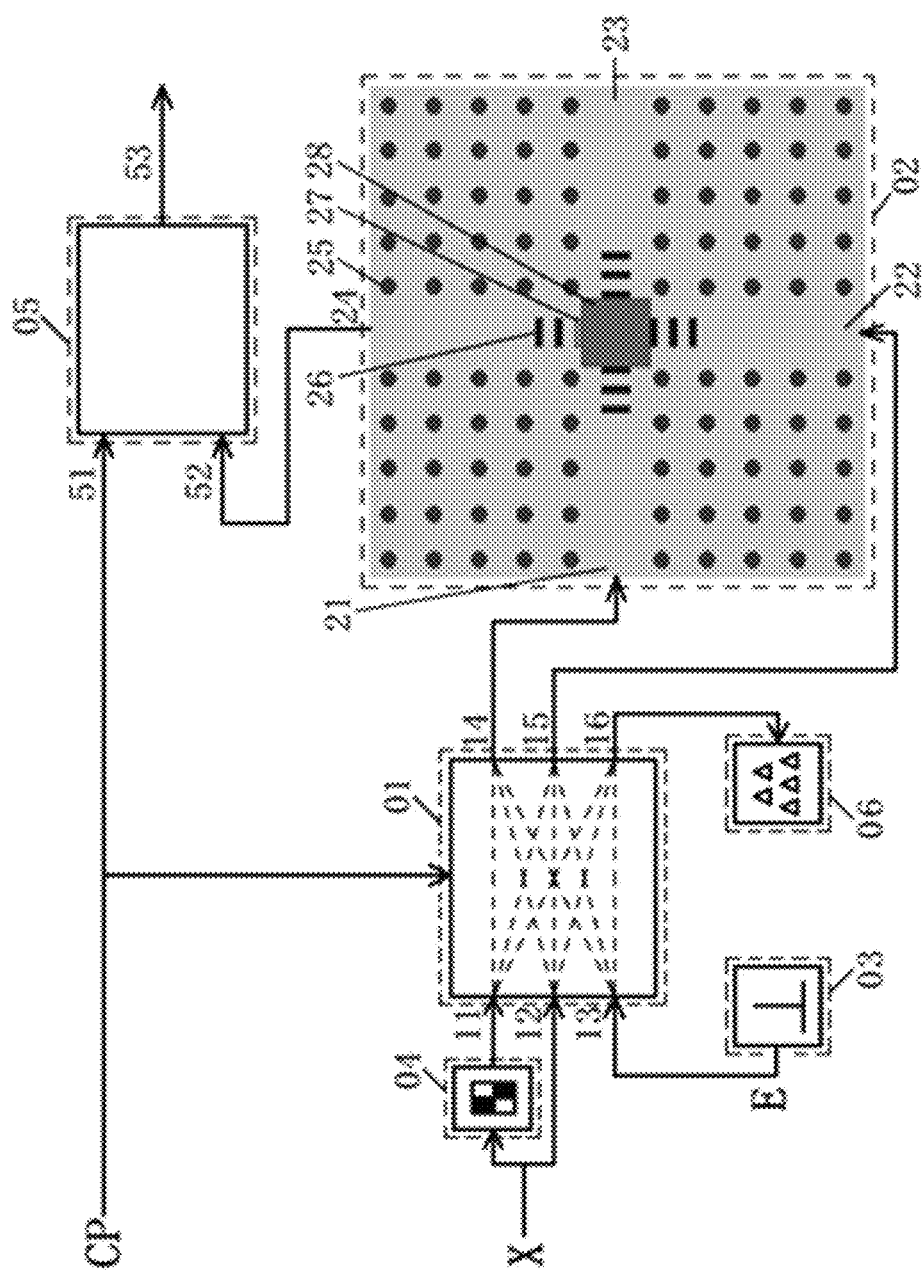
FIG. 1 is a structural schematic diagram of a PhC all-optical multistep-delay self-OR-transformation logic gate of the present invention.

The present invention is more specifically described in the following paragraphs by reference to the drawings attached only by way of example.

DETAILED DESCRIPTION OF THE EMBODIMENTS

The terms a or an, as used herein, are defined as one or more than one, the term plurality, as used herein, is defined as two or more than two, and the term another, as used herein, is defined as at least a second or more.

Figure 4:
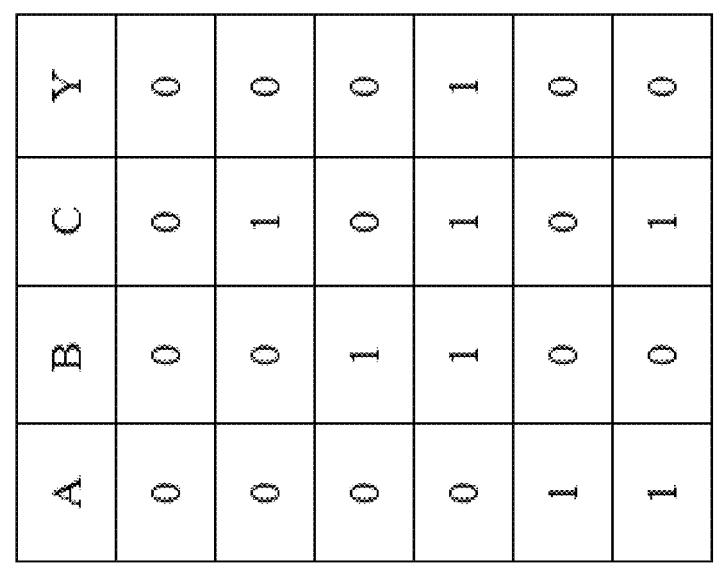

As shown in FIG. 4, the PhC all-optical multi-step delay self-OR transformation logic gate of the present invention includes an optical switch unit 01, a PhC structure unit 02, a reference-light source 03, a memory or delayer 04, a D-type flip-flop unit 05 and a wave absorbing load 06; the optical switch unit 01 is a 3×3 optical selector switch controlled by a clock-signal CP, is used for controlling and selecting a logic-signal for outputting, and includes a first clock-signal input port, a delay-signal input port, a logic-signal input port, a reference-light input port and three intermediate-signal output ports; and the three intermediate-signal output ports are respectively a first intermediate-signal output port, a second intermediate-signal output port and a third intermediate-signal output port. The memory or delayer 04 includes an input port and an output port; a logic-signal X is connected to the input port of a two-branch waveguide, one output port of the two-branch waveguide is connected with the input port of the memory 04, a delay-signal $X(n-k)$ output by the output port of the memory is connected to the delay-signal input port 11 of the optical selector switch, the memory or delayer is the one of k-step delay, and the memory is used for storing and outputting a signal input to the memory before k steps; the other output port of the two-branch waveguide is connected with the logic-signal input port 12 of the optical selector switch, reference-light E output by the reference-light 03 is connected with the reference-light input port 13 of the optical selector switch, and the reference-light E output by the reference-light source is 1; the first intermediate-signal input port 21 of the PhC structure unit 02 is connected with the first intermediate-signal output port 14 of the optical selector switch, the second intermediate-signal input port 22 of the PhC structure unit 02 is connected with the second intermediate-signal output port 15 of the optical selector switch, and the wave absorbing load 06 is connected with the third intermediate-signal output port 16 of the optical selector switch; the wave absorbing load is used for absorbing light wave entering it; the D-type flip-flop unit 05 includes a second clock-signal input port, a D-signal input port and a system output port; a clock-signal CP is input through the input port of a two-branch waveguide, one port of the two-branch waveguide is connected with the first clock-signal input port of the optical switch unit 01, and the other port of the two-branch waveguide is connected with the second clock-signal input port 51 of the D-type flip-flop unit 05; the D-signal input port 52 of the D-type flip-flop unit 05 is connected with the signal output port 24 of the PhC structure unit 02, i.e., the input signal at the D-signal input port 52 of the D-type flip-flop unit 05 is equal to the output signal at the output port of the PhC structure unit; the system-signal output port 53 of the D-type flip-flop unit 05 is the system-output port of the PhC all-optical multi-step delay self-OR-transformation logic gate of the present invention; the PhC structure unit 02 is a 2D-PhCcross-waveguide nonlinear cavity and is arranged behind the optical switch unit, the background filling material for the 2D PhC is air or a different low-refractive-index medium having a refractive index less than 1.4, the cross section of the high-refractive-index dielectric pillar of the 2D PhC is circular, oval, triangular or polygonal, the 2D-PhCcross-waveguide nonlinear cavity is a 2D-PhCcross-waveguide four-port network formed by high-refractive-index dielectric pillars, the four-port network has a four-port PhC structure, the left port is a first intermediate-signal input port, the lower port is a second intermediate-signal input port, the upper port is a signal output port, and the right port is an idle port; two mutually-orthogonal quasi-1D PhC structures are placed in two waveguide directions crossed at a center of across waveguide, the cross section of the dielectric pillar in the quasi-1D PhC is rectangular, polygonal, circular or oval, the refractive index of the dielectric pillar is 3.4 or a different value more than 2, a dielectric pillar is arranged in the middle of the cross waveguide, thee dielectric pillars are made of a nonlinear material, the cross section of the dielectric pillar is square, circular, oval, triangular or polygonal, and the quasi-1D PhC structures and the dielectric pillar constitute a waveguide defect cavity. The lattice constant of the 2D-PhCarray is d, and the array number is 11×11; the circular high-refractive-index linear-dielectric pillar 25 is made of a silicon (Si) material, and has a refractive index of 3.4 and a radius of 0.18 d; the first rectangular high-refractive-index linear-dielectric pillar 26 has a refractive index of 3.4, long sides of 0.613 d and short sides of 0.162 d; the second rectangular high-refractive-index linear-dielectric pillar 27 has a dielectric constant being the same as that of a nonlinear-dielectric pillar under low-light-power conditions, and has a dimension equal to that of the first rectangular high-refractive-index linear-dielectric pillar 26; and the central square nonlinear-dielectric pillar 28 is made of a Kerr type nonlinear material, and has a side length of 1.5 d, a dielectric constant of 7.9 under low-light-power conditions and a third-order nonlinear coefficient of $1.33 \times 10^{-2}$ μm$^2$/V$^2$. Twelve rectangular high linear-dielectric pillars and one square nonlinear-dielectric pillar are arranged in the center of the 2D-PhCcross-waveguide nonlinear cavity in the form of a quasi-1D PhC along longitudinal and transverse waveguide directions, the central nonlinear-dielectric pillar clings to the four adjacent rectangular linear-dielectric pillars and the distance there between is 0, every two adjacent rectangular linear-dielectric pillars are spaced 0.2668 d from each other, and the dielectric constant of a rectangular linear pillar clinging to the central nonlinear pillar and close to the signal-output port is equal to that of the central nonlinear pillar under low-light-power conditions.

The present invention can realize a self-OR-transformation logic gate function and a multi-step delay self-OR-transformation logic gate function of all-optical logic-signals under the cooperation of unit devices such as the optical switch, based on the photonic bandgap (PBG) characteristic, quasi-1D PhC defect state, tunneling effect and optical Kerr nonlinear effect of the 2D-PhCcross-waveguide nonlinear cavity shown by 02 in FIG. 1. Introduced first is the basic principle of the PhC nonlinear cavity in the present invention: a 2D PhC provides a PBG with certain bandwidth, a light wave with its wavelength falling into this bandgap can be propagated in an optical circuit designed inside the PhC, and the operating wavelength of the device is thus set to a certain wavelength in the PBG; the quasi-1D PhC structure arranged in the center of the cross-waveguide and the nonlinear effect of the central nonlinear-dielectric pillar together provide a defect state mode, which, as the input light wave reaches a certain light intensity, shifts to the operating frequency of the system, so that the structure produces the tunneling effect and signals are output from the output port 24.

Figure 2:
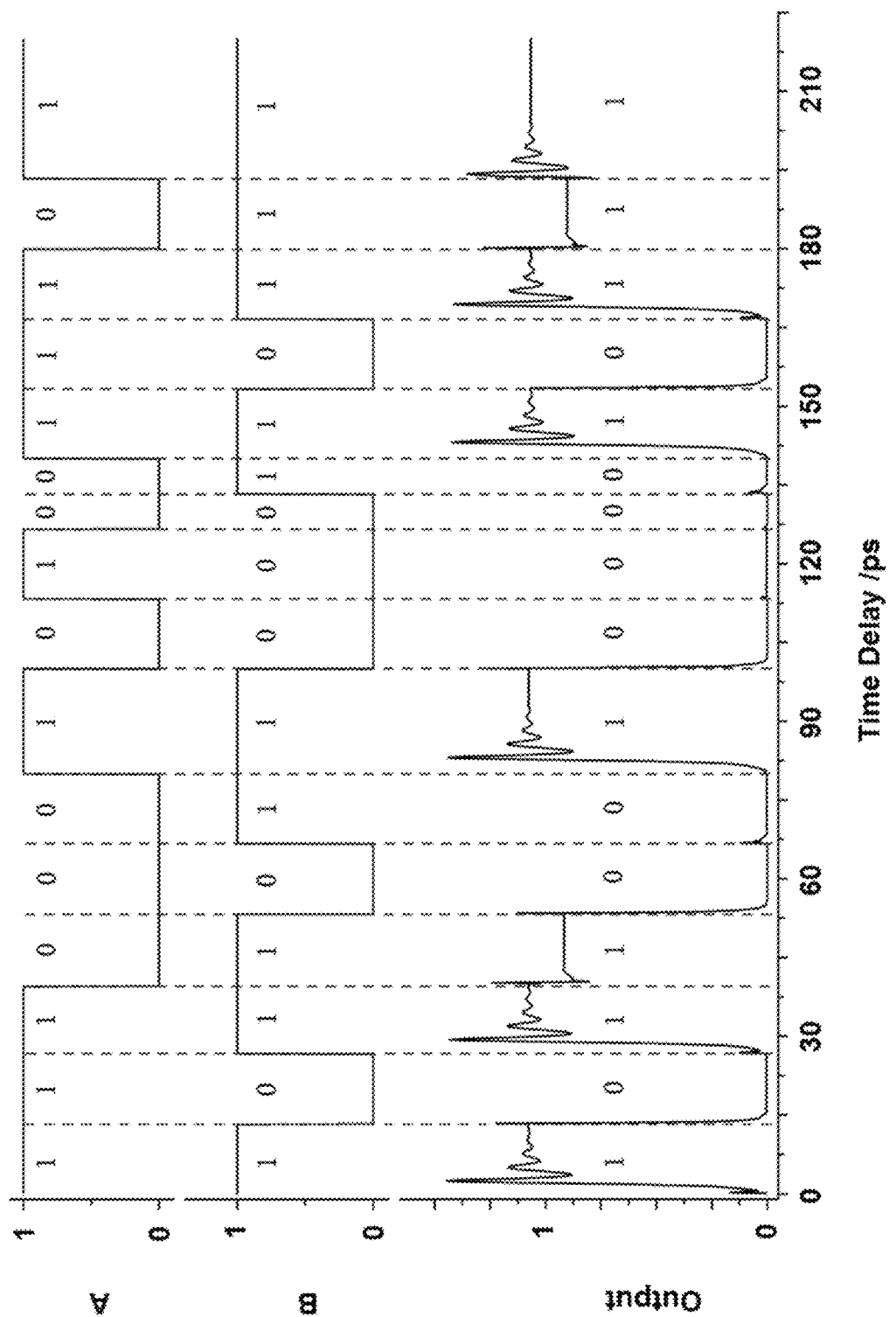
FIG. 2 is a waveform diagram of the basic logic functions of a PhC structure unit shown in FIG. 1 for the lattice constant d of 1 μm and the operating wavelength of 2.976 μm.

For the lattice constant d of 1 μm and the operating wavelength of 2.976 μm, referring to the 2D-PhCcross-waveguide nonlinear cavity shown by 02 in FIG. 1, and for a signal A input from the port 21 and a signal B input from the port 22 indicated respectively by the upper two diagrams in FIG. 2, the logic output-waveform diagram of the 2D-PhCcross-waveguide nonlinear cavity of the present invention, and logic output waveforms at the signal-output port 24 can be obtained, as shown by the signal waveforms in the lower part of FIG. 2. A logic operation truth table shown in FIG. 4 can be obtained according to the logic operation characteristic shown in FIG. 2. In FIG. 4, C is a current state $Q^n$, and Y is the signal output of the output port 24—next state $Q^{n+1}$. A logic expression of the structure can be obtained according to the truth table indicated in FIG. 4:

$$Y = AB + BC \qquad (1)$$

That is $$Q^{n+1} = AB + BQ^n \qquad (2)$$

According to the basic logic operation characteristic of the above 2D-PhCcross-waveguide nonlinear cavity, the logic output of the previous step serves as a logic input to the structure itself to realize the logic functions.

As shown in FIG. 4, for CP=0, the optical selector switch turns the input signal X(n−k) at the delay logic-signal input port 11 to the second intermediate-signal output port 15 of the optical selector switch (note: X(n) is a simplified form of $X(t_n)$ where $t_n$ is time, and n can be any integer), and the input signal X(n−k) is further projected to the second intermediate-signal input port 22 of the PhC structure unit 02, i.e., the input signal at the second intermediate-signal input port 22 of the PhC structure unit 02 is equal to the input signal X(n−k) at the delay logic-signal input port 11; simultaneously, the optical selector switch turns the reference-light E at the reference-light input port 13 to the first intermediate-signal output port 14 of the optical selector switch, and the reference-light E is further projected to the first intermediate-signal input port 21 of the PhC structure unit 02, i.e., the input signal at the first intermediate-signal input port 21 of the PhC structure unit 02 is equal to the reference-light E at the reference-light input port 13; and simultaneously, the optical selector switch turns the logic-signal X(n) at the logic-signal input port 12 to the third intermediate-signal output port 16 of the optical selector switch, and the logic-signal X(n) is further projected to the wave absorbing load 06.

For CP=1, the optical selector switch turns the input signal X(n−k+1) at the delay logic-signal input port 11 to the third intermediate-signal output port 16 of the optical selector switch, and the input signal X(n−k+1) is further projected to the wave absorbing load 06; simultaneously, the optical selector switch turns the logic-signal X(n+1) at the logic-signal input port 12 to the first intermediate-signal output port 14 of the optical selector switch, and the logic-signal X(n+1) is further projected to the first intermediate-signal input port 21 of the PhC structure unit 02, i.e., the input signal at the first intermediate-signal input port 21 of the PhC structure unit 02 is equal to the logic-signal X(n+1) at the logic-signal input port 12; and simultaneously, the optical selector switch turns the reference-light E at the reference-light input port 13 to the second intermediate-signal output port 15 of the optical selector switch, and the reference-light E is further projected to the second intermediate-signal input port 22 of the PhC structure unit 02, i.e., the input signal at the second intermediate-signal input port 22 of the PhC structure unit 02 is equal to the reference-light E at the reference-light input port 13.

With the cooperation described above, the multi-step delay self-OR-transformation logic function of all-optical logic signals can be realized.

The PhC structure of the device in the present invention can be of a (2k+1)×(2k+1) array structure, where k is an integer more than or equal to 3. Design and simulation results will be provided below in an embodiment given in combination with the accompanying drawings, wherein the embodiment is exemplified by an 11×11 array structure and a lattice constant d of 0.5208 μm.

The optical selector switch operates as follows under the control of a clock-signal CP:

At a moment $t_n$, CP is made equal to 0, the optical selector switch transmits the delay-signal X(n–k) at the delay-signal input port 11 to the second intermediate-signal output port, and the delay-signal X(n–k) is further projected to the second intermediate-signal input port 22 of the photonic crystal structure unit 02; the optical selector switch transmits the reference-light E at the reference-light input port 13 to the first intermediate-signal output port 14, and the reference-light E is further projected to the first intermediate-signal input port 21 of the PhC structure unit 02; and the optical selector switch transmits the signal X(n) at the logic-signal input port 12 to the third intermediate-signal output port 16, and the signal X(n) is further projected to the wave absorbing load 06. The output of the port 24 at this moment can be obtained from the expression (2):

$$Q^{n+1} = X(n-k) \quad (3)$$

At a moment $t_{n+1}$, CP is made equal to 1, the optical selector switch transmits the delay-signal X(n+1–k) at the delay-signal input port 11 to the third intermediate-signal output port 16, and the delay-signal X(n+1–k) is further projected to the wave absorbing load 06; the optical selector switch turns the signal X(n+1) at the logic-signal input port 12 to the first intermediate-signal output port 24, and the signal X(n+1) is further projected to the first intermediate-signal input port 21 of the PhC structure unit 02; and simultaneously, the optical selector switch transmits the reference-light E at the reference-light input port 13 to the second intermediate-signal output port 15, and the reference-light E is further projected to the second intermediate-signal input port 22 of the PhC structure unit 02. The output of the port 24 at this moment can be obtained from the expression (2):

$$Q^{n+1} = X(n+1) + X(n-k) \quad (4)$$

The output at the output port 24 of the PhC structure unit 02 is equal to the input of the D-signal input port 52 of the D-type flip-flop unit 05, and it can be obtained from the expressions (3) and (4) that the input signal D of the D-signal input port 52 is X(n–k) for CP=0 and X(n+1)+X(n–k) for CP=1.

It can be known according to the logic characteristic of the D-type flip-flop that for CP=1, the system output follows with the input signal D; and for CP=0, the system output keeps the input signal D at the previous moment. Thus, it can be known that the output $Q^{n+1}$ at the system output port 53 of the device in the present invention is X(n+1)+X(n–k) for CP=1; and at a next moment for CP=0, the system output keeps the output of the previous moment, i.e., the system output in a clock cycle is:

$$Q^{n+1} = X(n+1) + X(n-k) \quad (5)$$

Hence, the device in the present invention can realize the multi-step delay self-OR-transformation logic function of logic signals. If the memory is changed into a k-step delayer, the same function can be realized.

For the operating wavelength of 1.55 μm in the device, and the lattice constant d of 0.5208 μm for the PhC structure unit 02, the radius of the circular high-refractive-index linear-dielectric pillar 25 is 0.093744 μm; the long sides of the first rectangular high-refractive-index linear-dielectric pillar 26 are 0.3192504 μm, the short sides are 0.0843696 μm; the size of the second rectangular high-refractive-index linear-dielectric pillar 27 is the same as that of the first rectangular high-refractive-index linear-dielectric pillar 26; the side length of the central square nonlinear-dielectric pillar 28 is 0.7812 μm, and the third-order nonlinear coefficient is $1.33 \times 10^{-2}$ μm$^2$/V$^2$; and the distance between every two adjacent rectangular high-refractive-index linear-dielectric pillars is 0.13894944 μm. Based on the above parameters, as the delay-signal X(n–k) of the delay-signal input port 11 of the optical selector switch and the signal X(n) of the logic-signal port 12 are input according to the waveforms shown in FIG. 2, a system-output waveform diagram at the lower part of FIG. 2 can be obtained under the control of the clock-signal CP. Hence, the system carries out OR-logic operation on the logic input quantity X(n+1) and the logic input quantity X(n–k) of the previous moment. That is, the multi-step delay self-OR-transformation logic function of logic-signals is realized.

Figure 3:
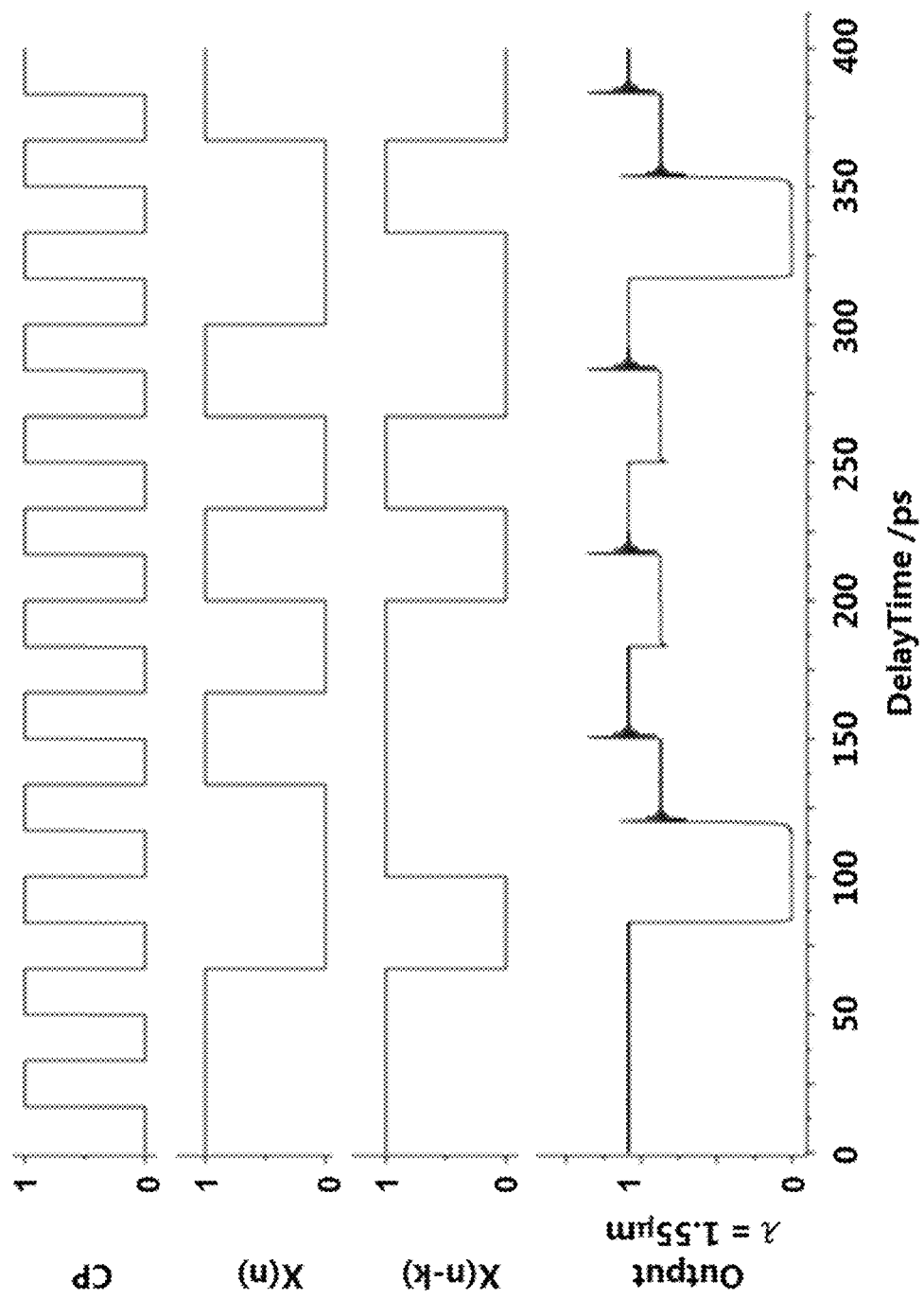
FIG. 3 is a waveform diagram of the logic function of the PhC all-optical multistep-delay self-OR logic gate of the present invention as the lattice constant d is 0.5208 μm and the operating wavelength is 1.55 μm.

The device in the present invention can realize the same logic function similar to that indicated in FIG. 3 under different lattice constants and corresponding operating wave lengths by scaling.

To sum up, the multi-step delay self-OR logic function of all-optical logic signals in the present invention can be realized through cooperation of a PhC structure unit with a 3×3 optical selector switch, a memory, a reference-light source, a wave absorbing load and a D-type flip-flop.

In the logic-signal processing in an integrated optical circuit self-convolution operation of a single logic-signal can be defined, and the above-mentioned self-OR logic operation of logic signals is a basic operation of the self-convolution operation of logic signals. The self-OR-transformation logic function of logic signals realized in the present invention plays an important role in realizing self-correlation transformation self-OR convolution operation of logic variables.

While the invention has been described in terms of various specific embodiments, those skilled in the art will recognize that the invention can be practiced with modification within the spirit and scope of the claims.

What is claimed is:

1. A Photonic Crystal (PhC) all-optical multistep-delay self-OR-transformation logic gate, comprising:
    an optical switch unit, a PhC structure unit, a reference-light source, a memory or a delayer, a D-type flip-flop unit and a wave absorbing load; a logic-signal (X) is connected to an input port of first two-branch waveguide, and two output ports of the first two-branch waveguide are respectively connected with an input port of the memory or the delayer and a logic-signal input port of said optical switch unit; an output port of said memory or the delayer is connected with a delay-signal input port of said optical switch unit; a reference-light output (E) from said reference-light source is connected with said reference-light input port of said optical switch unit;
    three intermediate-signal output ports of said optical switch unit are respectively connected with a first and second intermediate-signal input ports of said PhC structure unit and said wave absorbing load; a clock-signal (CP) is connected with an input port of second two-branch waveguide, and two output ports of the second two-branch waveguide are respectively connected with a first clock-signal input port of said optical switch unit and a second clock-signal input port of said D-type flip-flop unit;

and a signal-output port of said PhC structure unit is connected with a D signal input port of said D-type flip-flop unit.

2. The PhC all-optical multistep-delay self-OR-transformation logic gate in accordance with claim 1, wherein said optical switch unit is a 3×3 optical selector switch, and includes a clock-signal input port, a delay-signal input port, a logic-signal input port, and a reference-light input port and three intermediate-signal output ports.

3. The PhC all-optical multistep-delay self-OR-transformation logic gate in accordance with claim 1, wherein said PhC structure unit is a two-dimensional (2D) PhC cross-waveguide nonlinear cavity and is a 2D PhC cross-waveguide four-port network formed by high-refractive-index linear-dielectric pillars, and a left port, lower port, upper port and right port of four-ports correspond to a first intermediate-signal input port, a second intermediate-signal input port, a signal-output port and an idle port respectively; two mutually-orthogonal quasi-one-dimensional (quasi-1D) PhC structures are placed along longitudinal direction in vertical waveguide and transverse direction in horizontal waveguide, a nonlinear dielectric pillar is arranged in the middle of the cross waveguide, the nonlinear dielectric pillar is made of a nonlinear material, and a cross section of the nonlinear dielectric pillar is square, circular, oval, triangular, or polygonal; a dielectric constant of rectangular high-refractive-index linear-dielectric pillars clinging to the nonlinear dielectric pillar and close to said signal-output port of the PhC-structure unit is equal to that of the nonlinear dielectric pillar under weak light conditions; and said quasi-1D PhC structures and the nonlinear dielectric pillar constitute a waveguide defect cavity.

4. The PhC all-optical multistep-delay self-OR-transformation logic gate in accordance with claim 3, wherein said 2D PhC is a $(2k+1)*(2k+1)$ structure, where k is an integer equal to or greater than 3.

5. The PhC all-optical multistep-delay self-OR-transformation logic gate in accordance with claim 3, wherein a cross section of the high-refracture-index linear-dielectric pillars of said 2D PhC is circular, oval, triangular, or polygonal.

6. The PhC all-optical multistep-delay self-OR-transformation logic gate in accordance with claim 3, wherein a background filling material for the 2D PhC is a low-refractive-index dielectric having a refractive index less than 1.4.

7. The PhC all-optical multistep-delay self-OR-transformation logic gate in accordance with claim 3, wherein a background filling material for the 2D PhC is air.

8. The PhC all-optical multistep-delay self-OR-transformation logic gate in accordance with claim 3, wherein a cross section of the high-refractive-index linear-dielectric pillar of the cross waveguide is rectangular, polygonal, circular, or oval.

9. The PhC all-optical multistep-delay self-OR-transformation logic gate in accordance with claim 3, wherein high-refractive-index linear-dielectric pillar of the cross waveguide has a refractive index of value more than 2.

10. The PhC all-optical multistep-delay self-OR-transformation logic gate in accordance with claim 3, wherein high-refractive-index linear-dielectric pillar of the cross waveguide has a refractive index of 3.4.

11. The PhC all-optical multistep-delay self-OR-transformation logic gate in accordance with claim 1, wherein said memory or the delayer includes an input port and an output port; the output signal of the memory or the delayer equals an input signal input to the memory before k steps, where k is an integer equal to or greater than 3.

12. The PhC all-optical multistep-delay self-OR-transformation logic gate in accordance with claim 11, wherein said memory or the delayer is a k-step delayer.

13. The PhC all-optical multistep-delay self-OR-transformation logic gate in accordance with claim 1, wherein said D-type flip-flop unit includes a clock-signal input port, a D signal input port and a system output port; and said input signal of said D signal input port is equal to said output signal of the signal-output port of said PhC structure unit.

* * * * *